Jan. 16, 1934. G. W. BUNGAY 1,943,947
TIRE MOLD
Original Filed May 6, 1929 2 Sheets-Sheet 1
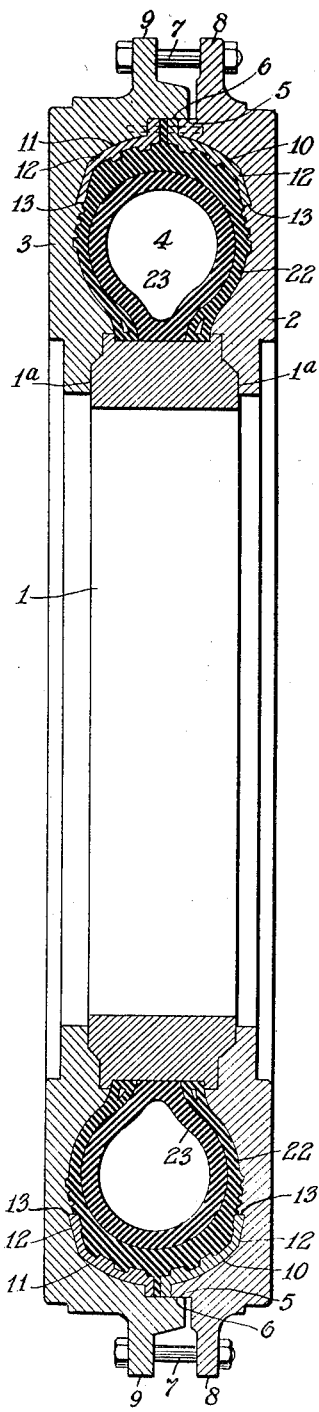
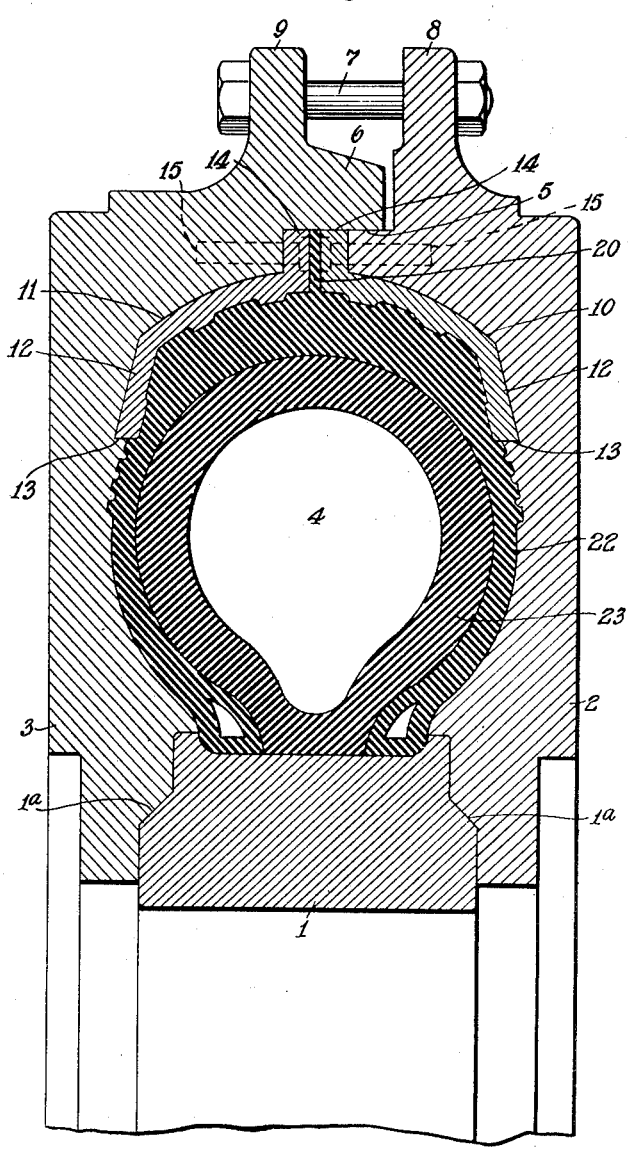
INVENTOR
George W. Bungay
BY
Wm. S. Pritchard
ATTORNEY Jan. 16, 1934.  G. W. BUNGAY  1,943,947
TIRE MOLD
Original Filed May 6, 1929  2 Sheets-Sheet 2
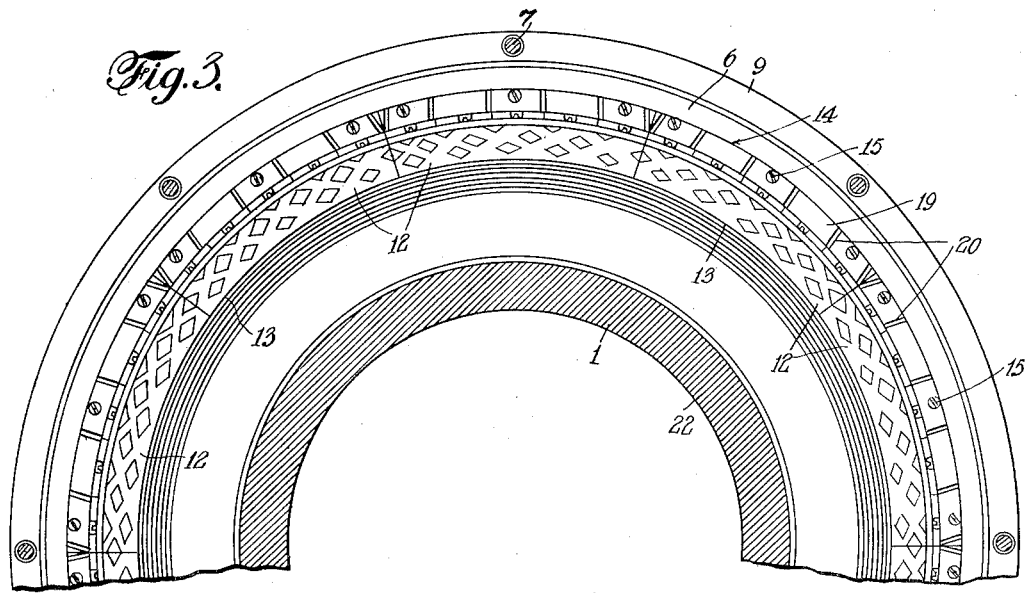
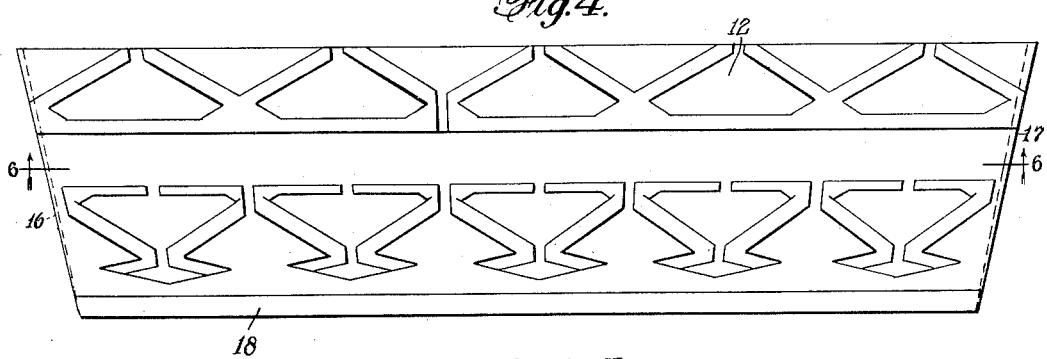
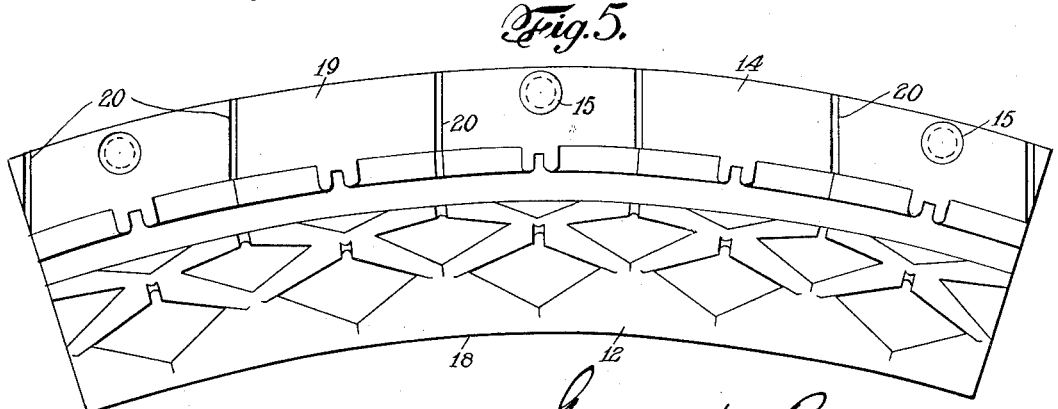
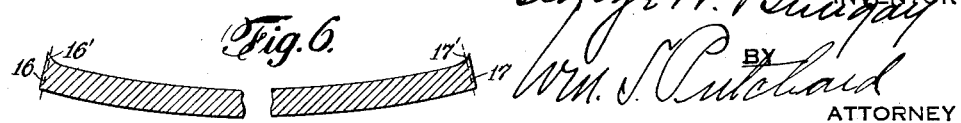

Patented Jan. 16, 1934

1,943,947

UNITED STATES PATENT OFFICE 1,943,947

TIRE MOLD

George W. Bungay, Plainfield, N. J., assignor to Aluminum Company of America, Pittsburgh, Pa., a corporation of Pennsylvania Original application May 6, 1929, Serial No. 360,753. Divided and this application July 11, 1930. Serial No. 467,183

3 Claims. (Cl. 18—44)

This invention relates to tire molds and more particularly to that class of molds which is used for molding treads on rubber tires.

This application is a division of my application, Serial No. 360,753, filed May 6, 1929.

Heretofore, the practice has been to make the mold from steel and to engrave a pattern for the non-skid tread on the inside of the mold. This has been a very expensive process when repeated many times and particularly so, since occasionally the design would become injured when removing the finished tire from the mold by an iron or crowbar because of the adherence of the rubber tread portion to the mold, and which it was necessary to use in order to loosen the finished tire in the mold.

Furthermore, with the steel molds now in use it is necessary to sand-blast the interior of the mold frequently, generally after forty or fifty tires have been made in the same mold, in order to remove the adhering particles of rubber called "barnacles" which tend to build up in the mold during the repeated operations.

By my invention the necessity of cutting a design in the mold is obviated, and I am able to use the main portions of the mold indefinitely and to renew the tread portion at will, whenever it is desired to change the design or whenever the design becomes worn or injured. Also, in molds, according to my invention, the barnacle-forming tendency is reduced to a minimum and frequent sand-blasting is not required, as there is practically no adherence of the rubber to the matrix, thus permitting the molds to be used approximately two hundred and fifty times or more before cleaning is necessary.

All of the above is accomplished by sectional die-cast aluminum or aluminum alloy matrices of novel construction and the novel arrangement and method by which they are assembled in the mold to provide a minimum of seams or joint surfaces.

Moreover, these matrices give the outside surface of the tire a very high polish and permit the tire to be stripped from the mold with far less difficulty than in the molds heretofore used. In addition, a supply of molds constructed in accordance with my invention may be made for one-fifth to one-tenth of the cost of the molds now in use, and in case of injury to the mold it is not necessary to discard the entire mold but only the injured portion, which portion may be quickly replaced without difficulty.

I am aware that an attempt has been made to form the matrices for tire molds from castings and to insert these matrices in the mold in sections, but these attempts prior to my invention have been failures, so that the large manufacturers of rubber tires still use steel molds with a design for the non-skid tread cut in the steel, as has always been the practice.

With the previous type of molds having sectional matrices, which it has been attempted to use, it was far more difficult to remove the tire from the mold than from the all-steel molds now used. Furthermore, there was a greater tendency for "barnacles" to grow in the sectional molds heretofore used than in the all-steel molds on account of the rubber adhering in the seams, crevices or to the ridges of the design, so that molds with sectional matrices have been heretofore worthless for any practical purpose.

Other objects and features of my invention will appear from the following description and the appended claims.

In the drawings which illustrate the preferred embodiment of my invention:

Figure 1 shows a cross-section along the diameter of the mold.

Figure 2 is a portion of Figure 1 enlarged.

Figure 3 is a side view of a section of my improved mold showing the tire removed from the mold.

Figure 4 is a plan view of one of the matrices.

Figure 5 is a side view of the matrix shown in Figure 4.

Figure 6 is a section on line 6—6 of Figure 4.

The mold to which the present invention is applicable may be of any suitable or desirable construction, but for the purposes of the present disclosure it is shown as comprising an inner steel ring 1 forming the base of the mold and outer annular side sections 2 and 3 positioned on opposite sides of the ring 1, respectively, forming complemental sides and top of the mold cavity 4. The inner circumferential edges of the side sections 2 and 3 are formed with means complemental to means on the sides of the ring 1, as at 1a, for maintaining the sections in position when the parts are secured together. The outer opposing edges of the sections 2 and 3 are formed with flanges 5 and 6 which overlap when the mold sections 2 and 3 are brought together. These sections 2 and 3 are secured in position by nut and bolt means 7 extending through outstanding flanges 8 and 9 upon the sections, respectively.

The side rings of sections 2 and 3 are channeled or grooved as at 10 and 11, respectively, on their cavity-forming faces and at points thereof corresponding to the tread portion of the tire. These channels or grooves 10 and 11 extend circumferentially around the sections 2 and 3 and receive the matrix 12.

The matrix 12 in the preferred form is composed of a plurality of segmental sections. Twelve or more of such sections are at present used to complete the tire tread surface, one set of matrices being placed in the channel 10 and another set in the channel 11.

The inner side edges of the channels 10 and 11 are formed to provide definite shoulders 13 against which the opposing edge of the matrix will abut, and the opposite edges of each matrix are formed with a laterally outwardly extending rib or flange 14 which lies opposite and abuts the meeting outer opposing edges of the side sections 2 and 3, and are secured thereto by means of screws 15, as can be clearly seen in Figures 1 and 2 of the drawing, thus eliminating the usual clamping ring. These flanges are also provided with meeting faces 19 which close the molding cavity between the sections 2 and 3 and enable the matrices to form a tread design up to the parting line between the mold sections.

Heretofore, in making molds having the matrix cast in sections, it has been the practice to cast the sections to the exact size desired. This has proved to be very unsatisfactory since the ends of the castings have slight roughnesses due to the molds in which they were made, and it has been impossible to prevent crevices being formed between the separate matrix into which the rubber flowed when under pressure. Since the rubber remained in the matrix on the next casting operation, rubber was built up until undesirable "barnacles" were formed which made it necessary to remove the matrices after almost every molding operation to clean out the rubber from the joints between the separate matrices.

I have found that by making the matrix from any suitable metal such as aluminum or aluminum alloy and by making the castings over-size and machining and smoothing off the excess metal at their edges to form tight seams or joints between the matrix sections, I have been able to obviate the difficulty of removing the tires from the molds and materially reduce the formation of barnacles.

Referring now to Figures 4 and 6, the matrix is cast with an excess amount of metal on each edge thereof, the edges destined to abut with the edges of the other matrices being also provided with beads. The excess on the ends is shown by the dotted lines 16 and 17 and the beads 16' and 17'.

After the sections are cast and the fins and gates removed, the next operation is to machine the ends 16 and 17 so that, when the individual matrices are brought together, a fit as true as possible will be obtained. The machining, though it removes a portion of the excess metal, does not entirely remove the beads. Thus, at the end of this operation the individual matrices have smooth ends provided with upstanding beads. The edge 18 is then machined to fit exactly to the shoulders 13 of the mold sections 2 and 3. The mold sections 2 and 3 are then heated to expand them and while so expanded the matrices are slipped into the channels 10 and 11 thereof. Upon shrinkage and contraction of the mold sections, due to cooling, the matrices are locked firmly together. No matter how true and exact the fit between the individual matrices is, there will usually be formed a joint which produces ridges on the tire. To eliminate this, after the matrices have been positioned in the mold, the beads are forced, rolled or otherwise introduced into the joints, whereby both the beads and joints are obliterated and no ridges or ribs are produced on the tire. The obliteration of the joints and beads may be accomplished in various manners. I have obtained satisfactory results by subjecting the faces of the matrices to a burnishing operation after locking them in the mold. This operation also sharpens the design on the tread, whereby a more distinct tread is produced on the tire.

The flanges 14 of the matrices are then fastened securely to the sections 2 and 3 by means of the screws or bolts 15. The mold sections are then placed in jigs and the faces 19 of the flanges 14 of the matrices 12 are machined and/or burnished. This machining and/or burnishing also smooths any projecting portions of the heads of the screws 15 so that, when the two sections 2 and 3 are bolted together, a very close fit between the flanges 14 of the matrices is permitted, enabling the design to be cast perfectly and permitting no rubber to escape at the junction of the faces 19 of the flanges 14 to form any barnacles on the mold or ridges on the tire, except what usually passes into the air vents 20 formed by complemental grooves in the machined faces 19 of the flanges 14. The air passing through the vents 20 finds its further escape between the joint of the overlapping flanges 5 and 6 of the mold sections.

In the manufacture of tires of this type, it is customary to place the carcass 22 of Figure 1 of a tire in the mold, insert the rubber necessary to form the tread, place an air bag or inner tube 23 inside the tire, close the mold and subject the tire to the usual vulcanizing operation. This causes the uncured rubber of the tread to first take the form of the matrix and then be vulcanized while remaining in the mold. This vulcanization is by heat. Owing to the fact that the matrices are made of aluminum or aluminum alloy, when the entire mold is heated the aluminum or aluminum alloy having a greater coefficient of expansion than the steel tends to force the sections still tighter together, so that no groove is formed between the separate matrices in which rubber can be deposited. Whenever the matrix becomes injured in removing the tire from the mold, it is very simple to knock out the injured section and replace it with a new one.

I have found that by the use of aluminum or alloy thereof a very glossy surface is imparted to the face of the tire which makes it easier to remove the tire from the mold and prevents the rubber of the tread from adhering thereto. Heretofore, in the steel molds formerly used only forty or fifty tires could be cast before it became necessary to sand-blast the molds before removing the rubber barnacles. By means of my invention four to five times the number of tires may be cast in my mold before it is necessary to clean it, which is preferably done by a blast of pumice, rottenrock or the like, and even then the accumulation in the mold is materially less than under present practices and conditions. With other molds having the matrices made in sections it was customary to remove the matrices from the mold and clean them after nearly every molding operation.

In the above method the segments were disposed in a heat-expanded mold. It is to be understood that, though this method is preferable, the invention is not limited thereto since it is apparent that the segments may be disposed in the mold without shrinking the mold. Thus, for example, the segments may be positioned in a cold mold, precautions being taken to obtain as true a fit as possible. The subsequent burnishing treatment will obliterate the joints and beads. In operation due to the fact that the segments have a greater coefficient of expansion than the mold, the heat of vulcanization will force the segments still tighter together.

I claim:

1. A mold comprising a pair of complemental members forming a molding cavity, each of said members having an annular channel in the cavity surface thereof, a plurality of metallic matrix sections disposed edge to edge in the channels each of said sections being detachable and removable independently of the others, and a portion of the metal constituting the original edges of said sections forced into the joints and seams between said sections to substantially obliterate the same.

2. A tire mold comprising separable members forming a molding cavity to receive a tire carcass, means for securing said members together, each of said members having an annular channel formed in the cavity surface thereof, segmental matrix sections arranged edge to edge in the channel of each member, the joints or seams between said sections being substantially obliterated, each section having one side edge thereof engaging a shoulder formed by said channel and the opposite edge thereof formed with an outwardly projecting flange extending between opposing edges of said members, means securing said flanges to said members, the opposing surfaces of said flanges of the matrices being brought into juxta relation when said members are secured together, said opposing surfaces of the matrix flanges being formed with grooves providing air vents, and overlapping flanges on said opposing edges of said members overlying said flanges of said matrices.

3. A tire mold comprising separable members forming a molding cavity to receive a tire carcass, means for securing said members together, each of said members having an annular channel formed in the cavity surface thereof, aluminum alloy segmental matrix sections arranged edge to edge in the channel of each member, the joints or seams between said sections being substantially obliterated, each section having one side edge thereof engaging a shoulder formed by said channel and the opposite edge thereof formed with an outwardly projecting flange extending between opposing edges of said members, means securing said flanges to said members, the opposing surfaces of said flanges of the matrices being brought into juxta relation when said members are secured together, said opposing surfaces of the matrix flanges being formed with grooves providing air vents, and overlapping flanges on said opposing edges of said members overlying said flanges of said matrices.

GEORGE W. BUNGAY.